(12) United States Patent
Marut et al.

(10) Patent No.: US 6,863,065 B2
(45) Date of Patent: Mar. 8, 2005

(54) PORTABLE CONCAVE REFLECTOR ASSEMBLY

(76) Inventors: Patricia J. Marut, 406 Sandalwood Road, Oakville, Ontario (CA), L6L 3S2; Philip R. Brunette, 406 Sandalwood Road, Oakville, Ontario (CA), L6L 3S2

( * ) Notice: Subject to any disclaimer, the term of this patent is extended or adjusted under 35 U.S.C. 154(b) by 0 days.

(21) Appl. No.: 10/720,528

(22) Filed: Nov. 25, 2003

(65) Prior Publication Data

US 2004/0107959 A1 Jun. 10, 2004

Related U.S. Application Data

(60) Provisional application No. 60/431,987, filed on Dec. 10, 2002.

(51) Int. Cl.[7] .................................................. F24J 2/02
(52) U.S. Cl. ........................ 126/681; 126/682; 126/696
(58) Field of Search .................................. 126/680, 681, 126/682, 684, 688–696, 600, 608; 359/883

(56) References Cited

U.S. PATENT DOCUMENTS

| | | |
|---|---|---|
| 277,884 A | 5/1883 | Clark |
| 2,586,583 A | 2/1952 | Wagner |
| 2,770,230 A | 11/1956 | Tarcici |
| 2,798,478 A | 7/1957 | Tarcici |
| 2,806,134 A | 9/1957 | Tarcici |
| 3,643,648 A | 2/1972 | Tarcici |
| 3,797,476 A | 3/1974 | Tarcici |
| 3,896,786 A * | 7/1975 | Clevett ..................... 126/681 |
| D245,884 S | 9/1977 | Jackson |
| 4,112,917 A | 9/1978 | Lang |
| 4,119,365 A | 10/1978 | Powell |
| D263,785 S | 4/1982 | Phillips |
| 4,347,834 A | 9/1982 | York |
| 4,378,790 A * | 4/1983 | Erwin ..................... 126/681 |
| 4,457,297 A | 7/1984 | Sobczak et al. |
| 4,469,089 A | 9/1984 | Sorko-Ram |
| 4,561,425 A | 12/1985 | Long et al. |
| 4,913,130 A | 4/1990 | Inagaki et al. |
| 5,090,399 A | 2/1992 | Tarcici |
| 5,322,053 A | 6/1994 | Leicht |
| 6,606,988 B2 * | 8/2003 | Clark ..................... 126/696 |

FOREIGN PATENT DOCUMENTS

DE    3520694    *   1/1986   .................. 126/681

OTHER PUBLICATIONS

White, Brett. Parabolic Solar Cookers By Island Earth [online]. Australia [retrieved on or before Dec. 9, 2002]. Retrieved from the Internet: <URL unknown>.

(List continued on next page.)

*Primary Examiner*—James C. Yeung
(74) *Attorney, Agent, or Firm*—Patrick J. Hofbauer

(57) ABSTRACT

A portable concave reflector assembly having a hub member, a plurality of blade members radiating from the hub member, hub interlocking means for holding each of the blade members in selectively locked and secured relation with respect to the hub member, and blade interlocking means for holding each of the blade members in selectively locked and secured relation with respect to each adjacent one of the blade members. Each one of the blade members is identical in size and shape to each other one of the blade members. Together, the hub member and the blade members of the portable concave reflector assembly form a continuous reflective front face in three hundred and sixty degrees about the hub member. The reflector assembly has a concave, dish-shaped profile that is capable of directing incident radiant and electromagnetic energy to a focal area and has utility as a portable cooking apparatus.

31 Claims, 5 Drawing Sheets

OTHER PUBLICATIONS

For a great family: The solar cooker with manual adjustment [online]. Switzerland, CNCS, Dec. 4, 2002 [retrieved on Apr. 28, 2004]. Translation of French website: <URL: http://web.archive.org/web/20021204083708/http://www.cuisinesolaire.com/F/parabolesmanuelles.htm>. Retrieved from the Internet: <URL: http://world.altavista.com/babelfish/tr>.

Solar Grill—Grill Powered by the Sun [online]. Switzerland, Tammock Trading & Marketing [retrieved on Jun. 29, 2002]. Retrieved from the Internet: <URL: http://www.tammock.com/SolargrillENG.htm>.

Solar digester—Sungrill [online]. Germany, EnergieWende Verlag, Sep. 1, 2002 [retrieved on Apr. 28, 2004]. Translation of German website: <URL: http://web.archive.org/web/20020901143706/http://www.solarenergie.com/sungrill.htm> Retrieved from the Internet: <URL: http://world.altavista.com/babelfish/tr>.

Solar Cookers [online]. Singapore, Pan Asia Networking program of the International Development Research Centre [retrieved on May 17, 2002]. Retrieved from the Internet: <URL: http://www.panasia.org.sg/nepalnet/crt/photosolar.htm>.

* cited by examiner

PORTABLE CONCAVE REFLECTOR ASSEMBLY

FIELD OF THE INVENTION

The present invention relates generally to a concave reflector, and more particularly, to a portable concave reflector assembly that has utility as a portable cooking apparatus.

BACKGROUND OF THE INVENTION

The increase in human scientific understanding of the various forms of radiant energy and electromagnetic radiation has led to a similar increase in our utilization of same, both as an energy source and otherwise. Concomitant with its growing importance to our society, there has been a continual demand for more and more efficient means by which we might harness and direct radiant energy and electromagnetic radiation for our own purposes.

In the wake of numerous crises over the continued availability of fossil fuels, and in recognition of other pressing environmental concerns, large segments of the population, including campers, cottagers, owners of recreational vehicles, home owners, and people living in third world countries, have increasingly turned to the sun as an inexpensive and viable alternative source of natural energy that is both renewable and readily available. Solar power enthusiasts have started to use concave reflectors as solar heat collectors, and as solar cooking devices. Spherical, parabolic and elliptical concave reflectors have thus far been used to direct substantially parallel waves of radiant and electromagnetic energy to and from their respective focussing areas. Among a large number of other things, concave reflectors and satellite dish antennas have also thus far allowed us to communicate over great distances, to provide patients with effective medical treatment, and even to calculate the distance to neighbouring stars. Now, by using concave reflectors as solar heat collectors, and as solar cooking devices, solar power enthusiasts are able to better direct and concentrate the radiating electromagnetic waves of the sun, so as to provide concentrated heat, among other things, in order to cook food, and to heat and sterilize water for drinking and washing purposes.

There have, however, been a number of problems associated with the practical use of concave reflectors in the context of solar cooking. First of all, because solar cooking is an activity that is most efficiently performed outside in the direct and unfiltered light of the sun, concave reflectors used for this purpose must be weather-resistant and/or easily movable to a sheltered location in the event of inclement and potentially damaging weather conditions. As such, there is a significant need for a cooking device that may be easily transported. This need is made even more predominant and pressing in the case of campers, who also require that such concave reflectors be capable of being compactly carried in transit, such as, for example, inside of a back-pack.

Several methods and devices have been developed to address these needs, such as, for example, by producing foldable and/or collapsible concave reflectors. Concave reflectors of this sort are typically formed from a plurality of blade members attached together at a respective one of their ends, about a common axis, so as to be rotatable thereabout, and slidably foldable or collapsible in fan-like manner. An example of such a device is seen in U.S. Design Pat. No. D245,884 (Jackson) for a Foldable Solar Cooker. According to designs of this general sort, however, the reflective surface of the concave reflector may have a tendency to become scratched, since the reflective surface of each of its respective blade members slides in frictional and direct juxtaposed relation to the rear surface of an adjacent blade member. Over time, and with the repeated folding or collapsing of concave reflectors of this general design, the reflective surface thereof may have a tendency to become scratched, and surface irregularities may be created thereon, in the manner as aforesaid. Naturally, these scratches and surface irregularities, with their tendency to diffuse and reflect incident electromagnetic radiation at odd and unpredictable angles, will affect adversely the ability of such concave reflectors to effectively direct radiant energy to and from the desired focal area, and likewise, they may have a negative effect on the proper and efficient functioning of such reflectors, whether as solar cookers or otherwise.

An example of a device that has been developed to overcome these problems is seen in U.S. Pat. No. 4,112,917 (Lang) for a Solar-ray Heating Apparatus. The Lang patent discloses a solar cooker design that has twelve blade members, each individually and removably secured between two central disc members. Each blade member has, at a respective narrow inner end portion thereof, a bent tab which engages a corresponding slot to hold the blade member on one of the discs and in an angular position relative to the other blade members. Each one of the blade members is detachable both from each other one of the blade members, and from the two central disc members. As well, according to the Lang design, two of the twelve blade members have a different shape from that of the others, so as to create a radial gap in the reflective surface of the reflector assembly, and so as to accommodate a post for attachment of the concave reflector to a tripod in an in-use configuration. A problem associated with concave reflector assemblies of this general design, however, stems from the fact that their reflective surface is interrupted or non-continuous (i.e., it does not extend in a full three hundred and sixty degrees about the disc members), such that there they have consequently lower cooking efficiency. A main problem is that the differing shapes of the various blade members necessitate an increased cost in the manufacture and repair of reflector assemblies according to this general design. What is needed, therefore, is an alternate design for a concave reflector assembly that utilizes a uniform size and shape for all of its individual blade members so that all of its blade members might be formed from a single mould, thereby reducing manufacturing and replacement costs.

It should also be noted that, although the Lang design specifies the use of bent tabs engaging corresponding slots so as to hold the blade members in place relative to the discs, this connection means is insufficient on its own, as disclosed by Lang, to ensure that the blade members and discs are held in locked and secured relation with respect to one another. Instead, concave reflectors according to the Lang design have an added level of complexity, insofar as they also rely on a centrally located secondary connection means that involves the sandwiching of their blade members between their two disc members, as aforesaid. Without the secondary connection means, the blade members of concave reflectors according to the Lang design could easily and unpredictably become detached from the disc members, both in strong weather conditions and when moving the reflector. Moreover, the Lang blade members may have a tendency to easily and unpredictably move out of planar alignment with one another along their radial edges, thereby disrupting the integrity of the concave surface of the reflector.

Other concave reflector assemblies having detachable blade members, and utilizing tab and slot connection means, have likewise been unreliable in ensuring that the blade members are held in locked and secured relation with respect to each other. In order to be properly usable in a wide array of geographic conditions and locations, an easily transportable solar cooking reflector assembly is required that is formed from a plurality of blade members, that utilizes a tab and slot connection means, and that also has a simple locking means for easily and selectively securing an individual tab member with respect to a corresponding slot, so as to allow easy disengagement of said tab from said slot and simple disassembly of the concave reflector as a whole. To date, concave reflector assemblies utilizing separable blade members with tab and slot connection means have either been unreliable and prone to detachment of their respective blade members, or have been notoriously hard to disassemble and difficult to effect disengagement of one blade member from another. In the former situation, the blade members have been known to become detached from each other at often particularly inopportune times, such as whilst a user is hosting a family cook-out. Conversely, in the latter event, disassembly of the prior art reflector assemblies has often been frustrated or become impossible when necessary to move the reflector on short notice, such as, for example, following the sudden onset of a thunderstorm. In either case, solar cooking enthusiasts have, to date, only been able to acquire solar reflectors that are inadequate to ensure such undesirable situations are consistently avoided.

The primary object of the invention is to provide a portable concave reflector assembly that is simple and inexpensive to manufacture and which is readily repairable by modular replacement of parts.

Another object of one aspect of the invention is to provide a portable concave reflector assembly that is capable of reflecting radiant and electromagnetic energy to a desired general focal area.

A further object of one aspect of the invention is to provide a portable concave reflector assembly that has a substantially continuous reflective surface.

Another object of the invention is to provide a portable concave reflector assembly that may be easily disassembled and transported.

A still further object of the invention is to provide a portable concave reflector assembly that has a reduced tendency to become scratched during transport and when in a disassembled configuration.

Yet another object of one aspect of the invention is to provide a portable concave reflector assembly that may be easily disassembled into completely separate and stackable portions for easy transport.

Yet still another object of one aspect of the invention is to provide a portable concave reflector assembly that, in the disassembled configuration, is of a suitable size and weight to be easily carried by a user inside of a back-pack or similar-sized carrying case.

Still another object of one aspect of the invention is to provide a portable concave reflector assembly that is constructed from a hub member together with a plurality of identical blade members that are easily replaceable.

A further object of the invention is to provide a portable concave reflector assembly in which each blade member is in selectively locked and secured relation with respect to each adjacent blade member and with respect to the hub member.

A still further object of the invention is to provide a portable concave reflector assembly that has detachable blade members, and that utilizes tab and slot connection means for selectively locking and securing each blade member with respect to each adjacent blade member and with respect to the hub member.

Yet still another object of the invention is to provide a portable concave reflector assembly that is constructed from light-weight flexible materials.

A still further object of one aspect of the invention is to provide a portable concave reflector assembly that may be easily mounted on a support, such as a standard camera tripod.

Another object of one aspect of the invention is to provide a portable concave reflector assembly of suitable size and focussing qualities so as to be useful as a solar cooker.

A further object of one aspect of the invention is to provide a portable concave reflector assembly that is capable of reflecting substantially parallel waves of radiant and electromagnetic energy from a focal area.

Yet another object of one aspect of the invention is to provide a portable concave reflector assembly that may be easily directed towards an incoming source of visible light.

A yet further object of the invention is to provide a portable concave reflector assembly that is of simple, secure, and reliable construction.

A still further object of the invention is to provide a portable concave reflector assembly that is inexpensive and easy to manufacture, transport, install, disassemble, and repair.

SUMMARY OF THE INVENTION

There is thus provided, according to one aspect of the invention, a portable concave reflector assembly comprising a hub member defining a hub axis, at least two blade members radiating from the hub member, a hub interlocking means for holding each of the blade members in selectively locked and secured relation with respect to the hub member, and a blade interlocking means for holding each of the blade members in selectively locked and secured relation with respect to each adjacent one of the blade members. Each one of the blade members is identical in size and shape to each other one of the blade members. Together, the hub member and the blade members form a continuous reflective front face throughout three hundred and sixty degrees about the hub axis. The reflector assembly has a concave dish-shaped profile for directing substantially parallel waves of incident radiant and electromagnetic energy to and from a general focal area.

According to another aspect of one embodiment of the invention, the portable concave reflector assembly further comprises a focal area support means for holding and supporting an item to be heated in the general focal area.

According to yet another aspect of one embodiment of the invention, the hub interlocking means is adapted for selective rotation of the hub member about the hub axis in a first substantially circumferential direction relative to the blade members from an unlocked hub configuration towards a locked hub configuration. In the unlocked hub configuration, each of the blade members is held in selectively disengagable relation with respect to the hub member, and in the locked hub configuration, each of the blade members is held in locked and secured relation with respect to the hub member.

According to still another aspect of one embodiment of the invention, the hub interlocking means comprises at least two hub connecting tabs extending from a perimeter hub portion 52 of the hub member in the first substantially circumferential direction, and at least two mating hub connecting slots formed at least one each in a narrow end portion of each respective one of the blade members. In the unlocked hub configuration, one each of the hub connecting tabs selectively engages in unobstructed through-passing relation a respective one of the mating hub connecting slots. In the locked hub configuration, the hub connecting tabs are selectively locked and secured in obstructed relation with the mating hub connecting slots. Preferably there are nine blade members, nine hub connecting tabs, and nine mating hub connecting slots formed one each in the narrow end portion of each respective one of the blade members. Preferably, each of the hub connecting slots is formed in a recessed hub overlapping portion that is shaped in the narrow end portion of each respective one of the blade members.

According to a further aspect of one embodiment of the invention, each of the hub connecting tabs comprises a substantially L-shaped hub connecting tab. Each L-shaped hub connecting tab firstly extends from the perimeter hub portion in a rearward direction and secondly extends in the first substantially circumferential direction. Preferably, the first substantially circumferential direction comprises a substantially counter-clockwise direction about the hub axis when the hub member is viewed from the rearward direction.

According to a still further aspect of one embodiment of the invention, the hub interlocking means further comprises a gripping means for gripping the hub member during rotation of the hub member relative to the blade members as aforesaid. According to a further aspect of the invention, the hub member has a central hub portion, and the gripping means comprises at least two grippable member portions shaped and formed in a rear face of the central hub portion. Preferably, there are nine grippable member portions.

According to another aspect of one embodiment of the invention, the blade interlocking means is adapted for selective movement of each respective one of the blade members in a first substantially radial direction relative to each adjacent one of the blade members from an unlocked blade configuration towards a locked blade configuration. In the unlocked blade configuration, a respective one of the blade members is held in selectively disengagable relation with respect to an adjacent one of the blade members, and in the locked blade configuration, the respective one of the blade members is held in locked and secured relation with respect to the adjacent one of the blade members.

According to a yet further aspect of one embodiment of the invention, the blade interlocking means comprises at least two blade connecting tabs extending from a first side portion of each respective one of the blade members in the first substantially radial direction, and at least two mating blade connecting slots formed in a second side portion of each respective one of the blade members. In the unlocked blade configuration, the blade connecting tabs engage in selectively unobstructed through-passing relation respective ones of the mating blade connecting slots formed in an adjacent one of the blade members. In the locked blade configuration, the blade connecting tabs are selectively locked and secured in obstructed relation with the mating blade connecting slots formed in the adjacent one of the blade members. Preferably, there are five blade connecting tabs, and five blade connecting slots formed five each in the second side portion of each the respective one of the blade members. Preferably, the blade connecting slots are formed five each in a recessed blade overlapping portion that is shaped in the second side portion of each the respective one of the blade members.

According to a yet still further aspect of one embodiment of the invention, each of the blade connecting tabs comprises a substantially L-shaped blade connecting tab. Each of the L-shaped hub connecting tab firstly extends from the first side portion in a rearward direction and secondly extends in the first substantially radial direction. Preferably, the first substantially radial direction comprises a substantially central direction.

According to another aspect of one embodiment of the invention, the reflector assembly further comprises a mounting means for securely mounting the reflector assembly relative to an incoming source of radiant energy. Preferably, the mounting means comprises a tripod mounting aperture shaped and formed in a rear face of the central hub portion for securely mounting the portable concave reflector assembly on a tripod.

According to a further aspect of one embodiment of the invention, the reflector assembly also comprises a directional guide means mounted on the front face for selectively and substantially aligning the reflector assembly with the incoming source of radiant energy. Preferably, the directional guide means comprises an elongate directional guide member rigidly mounted on a front hub face of the central hub portion, extending substantially normal thereto and defining a guide axis in substantially coaxial relation to the hub axis. When the radiant energy comprises visible light, the reflector assembly is substantially aligned with the incoming source of radiant energy as aforesaid by selectively inclining the front face of the reflector assembly such that the elongate directional guide member does not cast a shadow in any appreciable direction.

According to still another aspect of one embodiment of the invention, the concave dish-shaped profile of the reflector assembly is substantially spherical in shape.

According to an even further aspect of one embodiment of the invention, the hub member and blade members of the portable concave reflector assembly may be constructed from metals, plastics, and other suitably light-weight materials.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
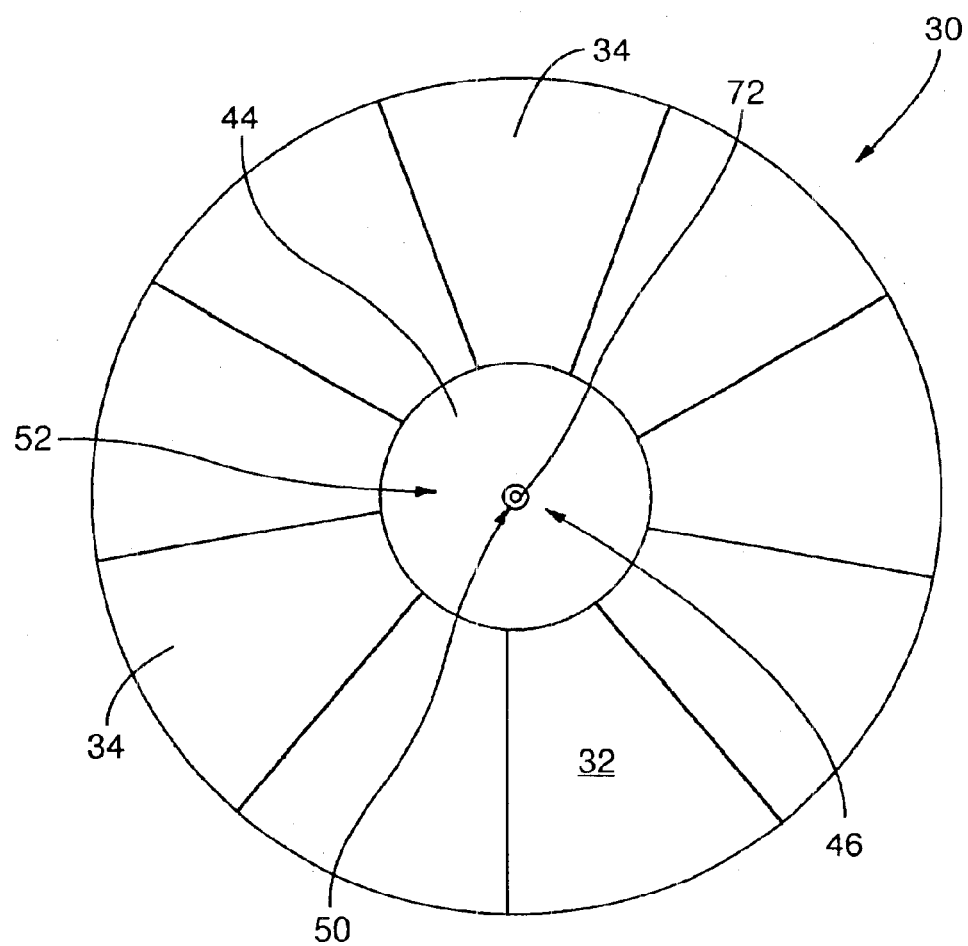
FIG. 1 is a front elevational view of a portable concave reflector assembly having a hub member and blade members.
Figure 2:
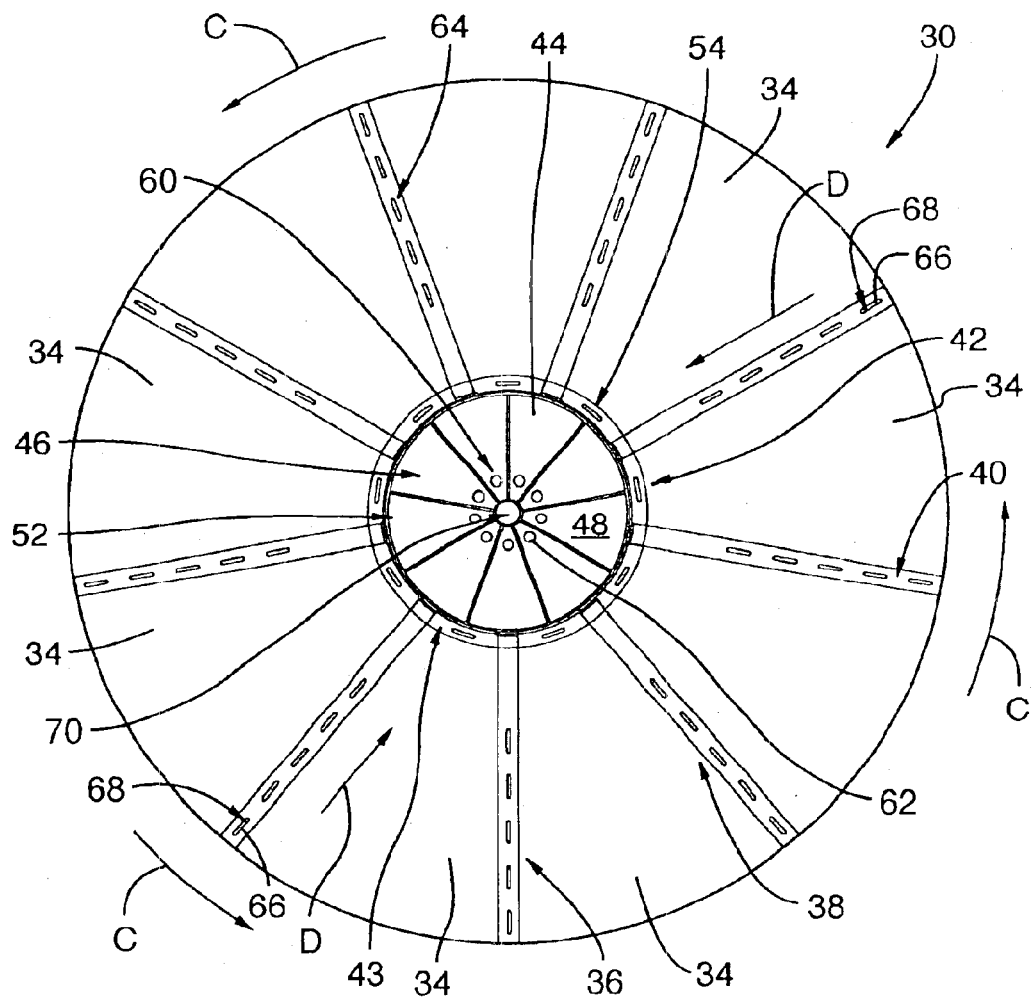
FIG. 2 is a rear elevational view of the portable concave reflector assembly of FIG. 1.

Referring now to FIGS. 1 through 6 of the drawings, there is shown a preferred embodiment of a portable concave reflector assembly 30. In FIG. 1, the portable concave reflector assembly 30 will be seen to comprise a hub member 44 and nine blade members 34 radiating therefrom. In FIG. 2, the portable concave reflector assembly 30 will be seen to further comprise a hub interlocking means 54 for holding each of the blade members 34 in selectively locked and secured relation with respect to the hub member 44. The portable concave reflector assembly 30 still further comprises a blade interlocking means 64 for holding each of the blade members 34 in selectively locked and secured relation with respect to each adjacent one of the blade members 34. As seen in both of FIGS. 1 and 2, each one of the blade members 34 is identical in size and shape to each other one of the blade members 34. As a result, all of the blade members 34 may be formed from a single mould, thus reducing the production costs associated therewith.

Figure 5:
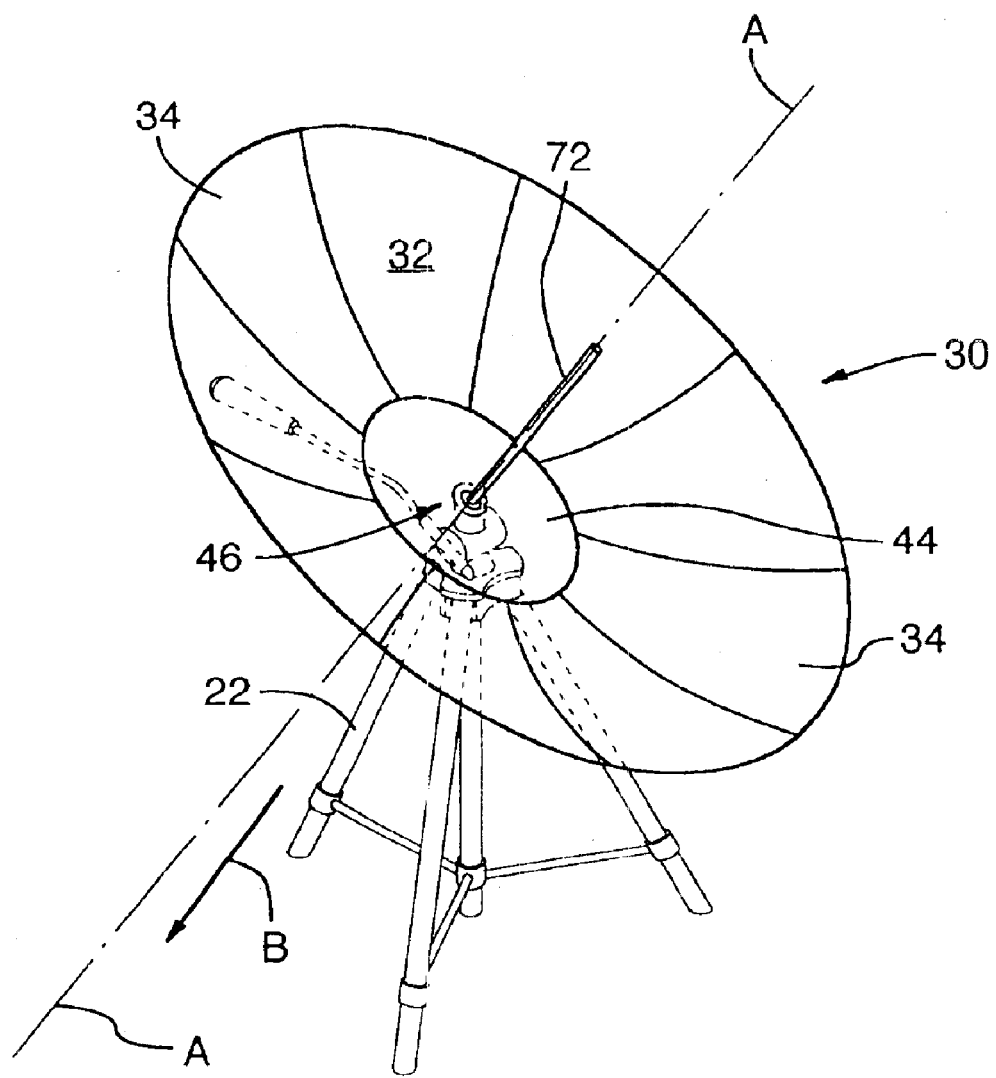
FIG. 5 is a front perspective view of the portable concave reflector assembly of FIG. 1, shown mounted on a standard camera tripod in partial phantom outline.
Figure 6:
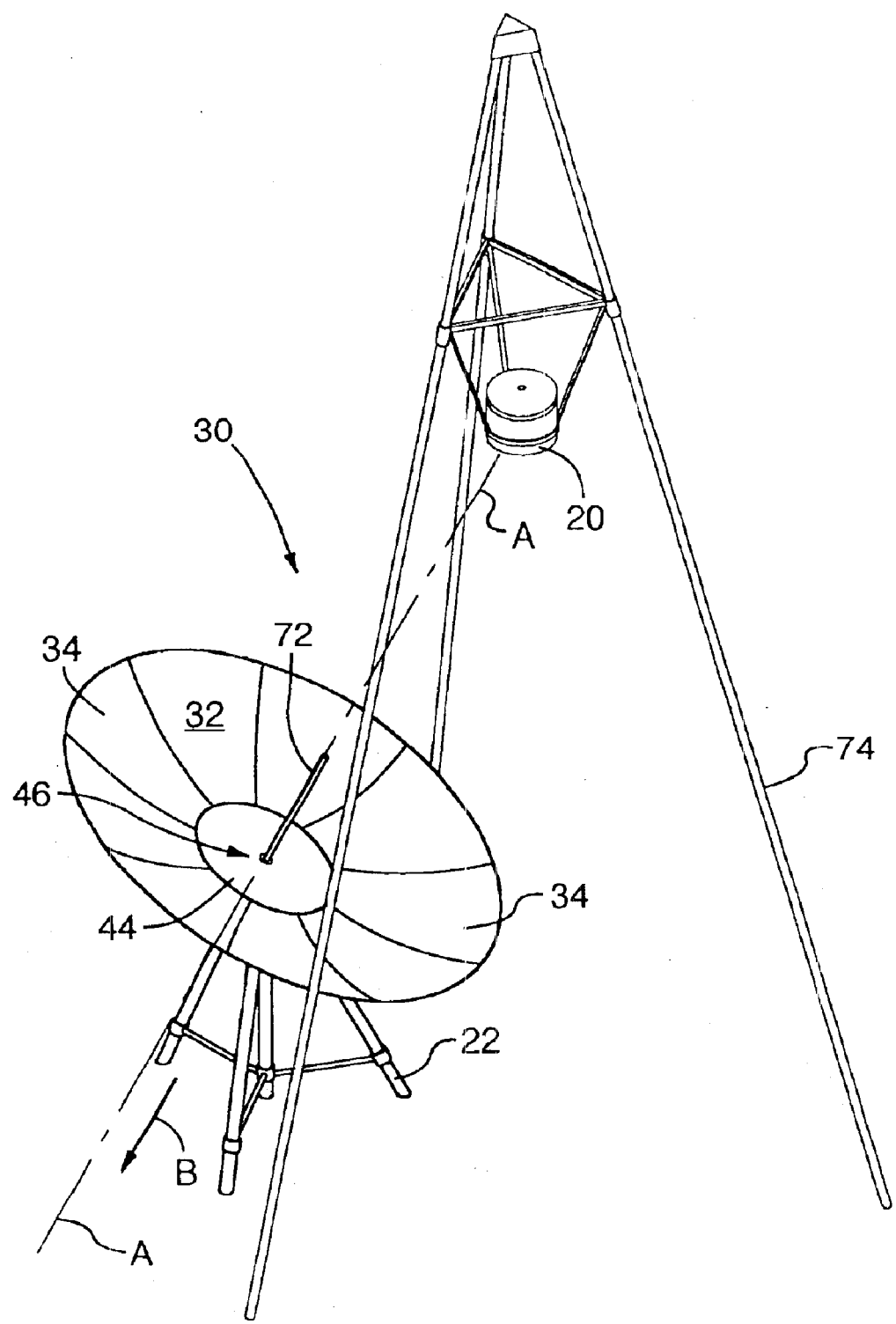
FIG. 6 is a front perspective view of the portable concave reflector assembly of FIG. 5, shown in use with a focal area support means.

As best seen in FIGS. 5 and 6, the hub member 44 and the blade members 34 of the portable concave reflector assembly 30 together form a continuous reflective front face 32 throughout three hundred and sixty degrees about a hub axis "A—A" of the hub member 44. The reflector assembly 30 has a concave dish-shaped profile, and in the preferred embodiment, this profile is substantially spherical in shape so as to be capable of directing substantially parallel waves of incident radiant and electromagnetic energy to a general focal area. While the general focal area is not specifically shown in the accompanying drawings, it coincides generally with the positioning of an item 20 to be heated or cooked (as shown in FIG. 6). In alternate embodiments of the portable concave reflector assembly (not shown), the concave dish-shaped profile of the reflector assembly may be elliptical or parabolic in shape, with such reflector assemblies being particularly useful in other contexts. The concave dish-shaped profile of the reflector assembly, whether spherical in shape, parabolic or otherwise, may also be useful in directing substantially parallel waves of incident radiant and electromagnetic energy from the focal area.

Figure 3:
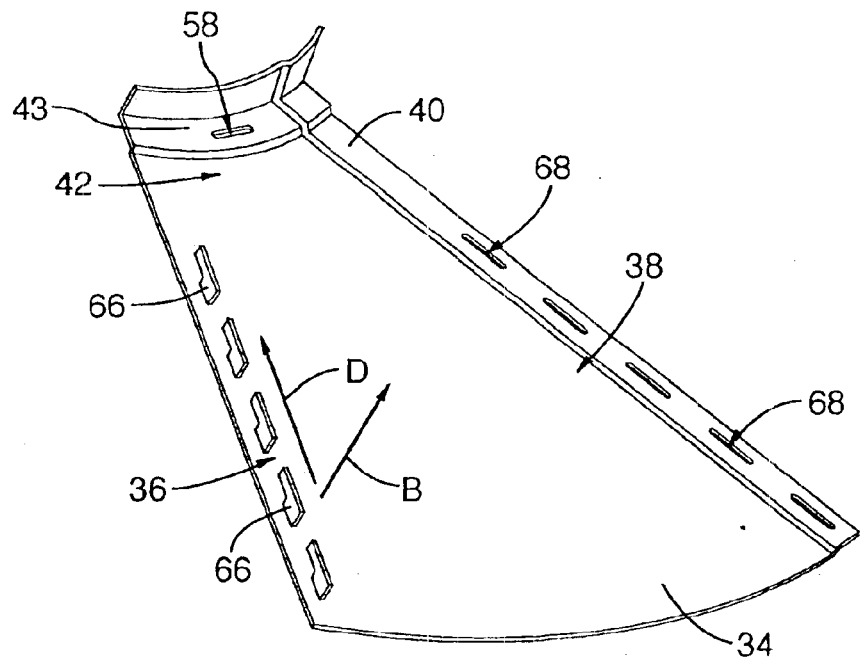
FIG. 3 is a rear perspective view of a blade member of the portable concave reflector assembly of FIG. 1, shown detached therefrom.
Figure 4:
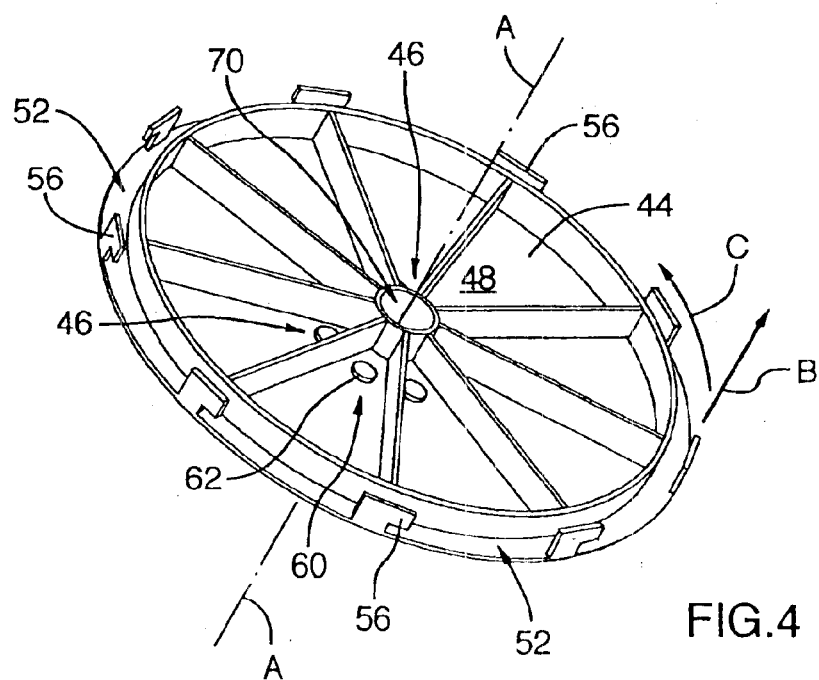
FIG. 4 is a rear perspective view of the hub member of the portable concave reflector assembly of FIG. 1, shown detached therefrom.

With specific reference to FIGS. 2 and 4 (and as best shown in FIG. 4), the hub member 44 of the reflector assembly 30 will be seen to have a rear face 48. As well, the hub interlocking means 54 will be seen to have nine L-shaped hub connecting tabs 56 extending from a perimeter hub portion 52 of the hub member 44 firstly in a rearward direction (as depicted inter alia by arrow "B" of FIG. 4), and secondly in a substantially circumferential counter-clockwise direction (as depicted by arrow "C" of FIG. 4) when facing the hub member 44 from the rearward direction "B". In an unlocked hub configuration, each respective one of the L-shaped hub connecting tabs 54 engages in unobstructed through-passing relation a different respectively corresponding mating hub connecting slot 58 that is formed in a narrow end portion 42 of each respective one of the blade members 34. As best seen in FIG. 3, the mating hub connecting slots 58 are formed one each through a recessed hub overlapping portion 43 that is formed and shaped in the narrow end portion 42 of each respective one of the blade members 34. In the unlocked hub configuration, each of the L-shaped hub connecting tabs 56 on the hub member 44 is selectively disengagable from each of the respectively mating hub connecting slots 58 on each of the blade members 34. From the unlocked hub configuration (and as best seen in FIG. 2), the hub member 44 may be rotated in the counter-clockwise direction "C" relative to the blade members 34 (when facing the portable concave reflector assembly 30 from the rearward direction "B"), so as to selectively lock and secure the blade members 34 with respect to the hub member 44 in a locked hub configuration (shown in FIGS. 1, 5 and 6), whereat each of the L-shaped hub connecting tabs 56 on the hub member 44 is in obstructed relation with the respective mating hub connecting slots 58 on each of the blade members 34. Preferably, the hub interlocking means 54 also includes a gripping means 60 for assisting in the rotation of the hub member 44 relative to the blade members 34 as aforesaid. More particularly, the gripping means 60 comprises at least two and preferably nine grippable member portions 62 shaped and formed in the rear face 48 of the central hub portion 46. The grippable member portions 62 may be provided as recessed grippable areas that are formed in the rear face 48 of the central hub portion 46 (as best seen in FIGS. 2 and 4), as raised grippable members, as apertures formed completely through the central hub portion 46, or as any other suitably grippable means. It will be noted that the provision of the gripping means 60 makes the hub interlocking means 54 comparatively simple and easy to use, in the manner aforesaid, to selectively secure each individual hub connecting tab 56 with respect to the respectively corresponding mating hub connecting slot 58.

With specific reference to FIGS. 2 and 3, the blade interlocking means 64 will be seen to comprise five L-shaped blade connecting tabs 66 extending from a first side portion 36 of each respective one of the blade members 34. In an alternate embodiment that is not shown in the figures, the blade interlocking means 64 may comprise four (instead of five) L-shaped blade connecting tabs 66 extending from the first side portion 36 of each respective one of the blade members 34. The blade connecting tabs 66 extend firstly in the rearward direction (as depicted inter alia by arrow "B" of FIG. 3) and secondly in a substantially radial central direction (as depicted by arrow "D" of FIG. 3). In an unlocked blade configuration, each respective one of the L-shaped blade connecting tabs 66 on one of the blade members 34 engages in selectively unobstructed through-passing relation a different respectively corresponding mating blade connecting slot 68 that is formed through a second side portion 38 of an adjacent one of the blade members 34. As best seen in FIG. 3, the mating blade connecting slots 68 are formed five each through a recessed blade overlapping portion 40 that is formed and shaped in the second side portion 38 of each respective one of the blade members 34. In the unlocked blade configuration, the L-shaped blade connecting tabs 66 of the blade member 34 are selectively disengagable from the respectively corresponding mating blade connecting slots 68 of the adjacent blade member 34. From the unlocked blade configuration (and as best seen in FIG. 2), one of the blade members 34 may be moved in the central direction "D" relative to one of its adjacent blade members 34, so as to selectively lock and secure the L-shaped blade connecting tabs 66 in obstructed relation with the respectively corresponding mating blade connecting slots 68 of the adjacent blade member 34. In this manner, the blade members 34 may be secured with respect to one another, so as to reach the locked blade configuration as shown in FIGS. 1, 5 and 6. It will be noted that the blade interlocking means 64 is, therefore, comparatively simple and easy to use, in the manner aforesaid, to selectively secure each individual blade connecting tab 66 with respect to the respectively corresponding mating blade connecting slot 68.

The hub member 44 has a central hub portion 46. The reflector assembly 30 is provided with a mounting means 70, which is preferably a tripod mounting aperture shaped and formed in the rear face 48 of the central hub portion 46, for easy mounting of the reflector assembly 30 on a standard camera tripod 22 (as best shown in FIG. 5). As well, and as best seen in FIG. 1, the front face 32 has a guide mounting aperture 50 shaped and formed therein, adjacent to the central hub portion 46, for easy mounting of a directional guide means 72, which is preferably an elongate directional guide member, on the reflector assembly 30. In use, and with the directional guide member mounted as shown in FIGS. 5 and 6, the reflector assembly 30 may be easily directed towards an incoming source of visible light (not shown) by adjusting the reflector assembly 30 on the standard camera tripod 22 until the directional guide member does not cast a shadow in any appreciable direction.

As aforesaid, a reflector assembly 30 having a parabolic profile is particularly useful in applications where it is necessary or desirable to direct incident electromagnetic radiation to or from a single focal point. Conversely, a reflector assembly 30 having a spherical profile is better able to direct incident radiant energy to a relatively wider general focal area. As such, a spherical reflector assembly 30 is useful for spreading radiant energy over a relatively wide area, as is desirable in the solar cooking context where a chef typically wishes to heat the entire bottom surface of a pan, rather than merely a single point thereon. As is shown in FIG. 6, in the solar cooking context, the preferred embodiment of the portable concave reflector assembly 30 also includes a focal area support means 74. The focal area support means 74 may be used to hold and support the item 20 to be heated in the general focal area.

In order to assemble and install the portable concave reflector assembly 30, each respective one of the L-shaped blade connecting tabs 66 is inserted in through-passing relation into a different respectively corresponding mating blade connecting slot 68 of an adjacent one of the blade members 34. With the L-shaped blade connecting tabs 66 engaging the respectively corresponding mating blade connecting slots 68, as aforesaid, the L-shaped blade connecting tabs 66 of one blade member 34 are moved in the central direction "D" relative to the respectively corresponding mating blade connecting slots 68 of the adjacent blade member 34, thus selectively locking and securing same relative to each other, and so as to reach the locked blade configuration. Thereafter, each respective one of the L-shaped hub connecting tabs 48 is inserted in through-passing relation into a different respectively corresponding mating hub connecting slot 58 of each respective one of the blade members 34. With the L-shaped hub connecting tabs 48 engaging their respectively corresponding mating hub connecting slots 58, and using the grippable member portions 62 of the gripping means 60, the hub member 44 is then rotated in the counter-clockwise direction "C" relative to the blade members 34 (when facing the portable concave reflector assembly 30 from the rearward direction "B"), thus selectively locking and securing same relative to each other, and so as to reach the locked hub configuration. The portable concave reflector assembly 30 may then be mounted on the tripod 22 or on another support (not shown), and/or it may be held by hand, to be used as a solar cooker or otherwise.

In order to disassemble the portable concave reflector assembly 30 into a disassembled configuration, or to facilitate the movement of same from one location to another, the above assembly and installation steps may simply be completed in reverse. In this manner, the portable concave reflector assembly 30 may be disassembled into completely separate and stackable portions for transport. In a disassembled configuration (not shown), the portable concave reflector assembly 30 is of a suitable size and weight to be easily carried by a user (not shown) inside of a back-pack or similar-sized carrying case. Accordingly, the portable concave reflector assembly 30 is easily transportable and does not require extensive disassembly to be moved. Among other things, because the portable concave reflector assembly 30 may be disassembled into completely separate and stackable portions, it has a reduced tendency to become scratched in comparison to other known devices.

It should also be noted that, in the preferred embodiment, the portable concave reflector assembly 30 is of suitable size and focussing qualities to be used as a solar cooker. All portions of the portable concave reflector assembly 30 may be constructed from one or more metal or plastic materials, provided the materials are suitably flexible and light-weight, have a sufficiently reflective finish for appropriately directing radiant energy and electromagnetic radiation, and are adequately resistant to the elements and other external influences, according to the preferred embodiment of the invention. Additionally, the construction materials and the overall design are such as to ensure a simple, secure, and reliable construction and a design which is relatively inexpensive to manufacture, install, disassemble, and repair. Furthermore, by selecting the construction materials, in significant part, so as to ensure a relatively light-weight construction, transportation costs will be minimized, as will the weight exerted on the back of a user carrying the portable concave reflector assembly 30 in the disassembled configuration. Because the portable concave reflector assembly 30 is preferably shipped in a disassembled and relatively compact bundle, the transportation costs are even further reduced.

Other modifications and alterations may be used in the design and manufacture of the present invention without departing from its spirit and scope, which is limited only by the accompanying claims. For example, the portable concave reflector assembly 30 may be provided with more or less than nine blade members 34. Similarly, the blade interlocking means 64 may be provided with more or less than five L-shaped blade connecting tabs 66. As well, the gripping means 60 may be provided with more or less than nine grippable member portions 62. Another pair of modifications that are obviously within the spirit and scope of the invention would be for the L-shaped blade connecting tabs 66 to extend in a substantially peripheral direction (rather than a central one), and/or for the L-shaped hub connecting tabs 56 to extend in a substantially clockwise direction. As well, the portable concave reflector assembly 30 may also be modified so as to be any of a variety of sizes to better accommodate different possible uses. Obviously, the present invention allows for a wide variety of different possible combinations of the various modifications and alterations specifically contemplated herein, and as such, it should perhaps be noted once again that the present invention is limited only by the accompanying claims.

We claim:

1. A portable concave reflector assembly comprising:
   (a) a hub member defining a hub axis;
   (b) at least two blade members radiating from said hub member, with each one of said blade members being identical in size and shape to each other one of said blade members;
   (c) a hub interlocking means for holding each of said blade members in selectively locked and secured relation with respect to said hub member; and (d) a blade interlocking means for holding each of said blade members in selectively locked and secured relation with respect to each adjacent one of said blade members;

wherein said hub member and said blade members together form a continuous reflective front face throughout three hundred and sixty degrees about said hub axis, and wherein said portable concave reflector assembly has a concave dish-shaped profile for directing substantially parallel waves of incident radiant energy to a general focal area;

wherein said hub interlocking means is adapted for selective rotation of said hub member about said hub axis in a first substantially circumferential direction relative to said blade members from an unlocked hub configuration towards a locked hub configuration; in said unlocked hub configuration, each of said blade members is held in selectively disengagable relation with respect to said hub member; and in said locked hub configuration, each of said blade members is held in locked and secured relation with respect to said hub member.

2. A portable concave reflector assembly according to claim 1, further comprising a focal area support means for holding and supporting an item to be heated in said general focal area.

3. A portable concave reflector assembly according to claim 1, wherein said hub interlocking means comprises:
  (a) at least two hub connecting tabs extending from a perimeter hub portion of said hub member in said first substantially circumferential direction;
  (b) at least two mating hub connecting slots formed at least one each in a narrow end portion of each respective one of said blade members;

wherein in said unlocked hub configuration, one each of said hub connecting tabs selectively engages in unobstructed through-passing relation a respective one of said mating hub connecting slots; and wherein in said locked hub configuration, said hub connecting tabs are selectively locked and secured in obstructed relation with said mating hub connecting slots.

4. A portable concave reflector assembly according to claim 3, wherein each of said hub connecting tabs comprises a substantially L-shaped hub connecting tab, each said L-shaped hub connecting tab firstly extending from said perimeter hub portion in a rearward direction and secondly extending in said first substantially circumferential direction.

5. A portable concave reflector assembly according to claim 4, wherein said at least two blade members comprise nine blade members, wherein said at least two hub connecting tabs comprise nine hub connecting tabs, and wherein said at least two mating hub connecting slots comprise nine mating hub connecting slots formed one each in said narrow end portion of each said respective one of said blade members.

6. A portable concave reflector assembly according to claim 5, wherein each of said hub connecting slots is formed in a recessed hub overlapping portion that is shaped in said narrow end portion of each said respective one of said blade members.

7. A portable concave reflector assembly according to claim 6, wherein said first substantially circumferential direction comprises a substantially counter-clockwise direction about said hub axis when said hub member is viewed from said rearward direction.

8. A portable concave reflector assembly according to claim 1, wherein said hub interlocking means further comprises a gripping means for gripping said hub member during rotation of said hub member relative to said blade members as aforesaid.

9. A portable concave reflector assembly according to claim 8, wherein said hub member has a central hub portion, and wherein said gripping means comprises at least two grippable member portions shaped and formed in a rear face of said central hub portion.

10. A portable concave reflector assembly according to claim 9, wherein said at least two grippable member portions comprise nine grippable member portions.

11. A portable concave reflector assembly according to claim 1, wherein said reflector assembly further comprises a mounting means for securely mounting said reflector assembly relative to an incoming source of radiant energy.

12. A portable concave reflector assembly according to claim 11, wherein said hub member has a central hub portion, and wherein said mounting means comprises a tripod mounting aperture shaped and formed in a rear face of said central hub portion for securely mounting said portable concave reflector assembly on a tripod.

13. A portable concave reflector assembly according to claim 1, wherein said reflector assembly further comprises a directional guide means mounted on said front face for selectively and substantially aligning said reflector assembly with an incoming source of radiant energy.

14. A portable concave reflector assembly according to claim 13, wherein said hub member has a central hub portion, wherein said directional guide means comprises an elongate directional guide member rigidly mounted on a front hub face of said central hub portion, extending substantially normal thereto and defining a guide axis in substantially coaxial relation to said hub axis, and wherein, when said radiant energy comprises visible light, said reflector assembly is substantially aligned with said incoming source of radiant energy as aforesaid by selectively inclining said front face of said reflector assembly such that said elongate directional guide member does not cast a shadow in any appreciable direction.

15. A portable concave reflector assembly according to claim 1, wherein said concave dish-shaped profile of said reflector assembly is substantially spherical in shape.

16. A portable concave reflector assembly according to claim 1, wherein said hub member and said blade members of said portable concave reflector assembly may be constructed from metals, plastics, and other suitably lightweight materials.

17. A portable concave reflector assembly according to claim 1, wherein said concave dish-shaped profile is adapted for directing substantially parallel waves of incident radiant energy from said general focal area.

18. A portable concave reflector assembly comprising:
  (a) a hub member defining a hub axis;
  (b) at least two blade members radiating from said hub member, with each one of said blade members being identical in size and shape to each other one of said blade members;
  (c) a hub interlocking means for holding each of said blade members in selectively locked and secured relation with respect to said hub member; and
  (d) a blade interlocking means for holding each of said blade members in selectively locked and secured relation with respect to each adjacent one of said blade members;

wherein said hub member and said blade members together form a continuous reflective front face throughout three hundred and sixty degrees about said hub axis, and wherein said portable concave reflector assembly has a concave dish-shaped profile for directing substantially parallel waves of incident radiant energy to a general focal area; and wherein said blade interlocking means is adapted for selective movement of each respective one of said blade members in a first substantially radial direction relative to each said adjacent one of said blade members from an unlocked blade configuration towards a locked blade configuration; in said unlocked blade configuration, said respective one of said blade members is held in selectively disengagable relation with respect to said adjacent one of said blade members; and in said locked blade configuration, said respective one of said blade members is held in locked and secured rel relation with respect to said adjacent one of said blade members.

19. A portable concave reflector assembly according to claim 18, wherein said blade interlocking means comprises:

(a) at least two blade connecting tabs extending from a first side portion of each said respective one of said blade members, said blade connecting tabs extending in said first substantially radial direction;

(b) at least two mating blade connecting slots formed in a second side portion of each said respective one of said blade members;

wherein in said unlocked blade configuration, said blade connecting tabs engage in selectively unobstructed through-passing relation respective ones of said mating blade connecting slots formed in said adjacent one of said blade members; and wherein in said locked blade configuration, said blade connecting tabs are selectively locked and secured in obstructed relation with said mating blade connecting slots formed in said adjacent one of said blade members.

20. A portable concave reflector assembly according to claim 19, wherein each of said blade connecting tabs comprises a substantially L-shaped blade connecting tab, each said L-shaped hub connecting tab firstly extending from said first side portion in a rearward direction and secondly extending in said first substantially radial direction.

21. A portable concave reflector assembly according to claim 20, wherein said at least two blade connecting tabs comprise five blade connecting tabs, and wherein said at least two mating blade connecting slots comprise five blade connecting slots formed five each in said second side portion of each said respective one of said blade members.

22. A portable concave reflector assembly according to claim 21, wherein said blade connecting slots are formed five each in a recessed blade overlapping portion that is shaped in said second side portion of each said respective one of said blade members.

23. A portable concave reflector assembly according to claim 22, wherein said first substantially radial direction comprises a substantially central direction.

24. A portable concave reflector assembly according to claim 18, further comprising a focal area support means for holding and supporting an item to be heated in said general focal area.

25. A portable concave reflector assembly according to claim 18, wherein said reflector assembly further comprises a mounting means for securely mounting said reflector assembly relative to an incoming source of radiant energy.

26. A portable concave reflector assembly according to claim 25, wherein said hub member has a central hub portion, and wherein said mounting means comprises a tripod mounting aperture shaped and formed in a rear face of said central hub portion for securely mounting said portable concave reflector assembly on a tripod.

27. A portable concave reflector assembly according to claim 18, wherein said reflector assembly further comprises a directional guide means mounted on said front face for selectively and substantially aligning said reflector assembly with an incoming source of radiant energy.

28. A portable concave reflector assembly according to claim 27, wherein said hub member has a central hub portion, wherein said directional guide means comprises an elongate directional guide member rigidly mounted on a front hub face of said central hub portion, extending substantially normal thereto and defining a guide axis in substantially coaxial relation to said hub axis, and wherein, when said radiant energy comprises visible light, said reflector assembly is substantially aligned with said incoming source of radiant energy as aforesaid by selectively inclining said front face of said reflector assembly such that said elongate directional guide member does not cast a shadow in any appreciable direction.

29. A portable concave reflector assembly according to claim 18, wherein said concave dish-shaped profile of said reflector assembly is substantially spherical in shape.

30. A portable concave reflector assembly according to claim 18, wherein said hub member and said blade members of said portable concave reflector assembly may be constructed from metals, plastics, and other suitably lightweight materials.

31. A portable concave reflector assembly according to claim 18, wherein said concave dish-shaped profile is adapted for directing substantially parallel waves of incident radiant energy from said general focal area.

* * * * *